United States Patent
Rousseau et al.

(10) Patent No.: US 11,064,674 B1
(45) Date of Patent: Jul. 20, 2021

(54) AUTOMATIC COW MILKING DEVICE

(71) Applicant: Milkomax Solutions Laitières Inc., Sainte-Monique (CA)

(72) Inventors: Victor Rousseau, Nicolet (CA); Gilles Smith, Nicolet (CA); Mario Leblanc, Ste-Brigitte-des-Saults (CA); Michael Provencher, Vctoriaville (CA); Gilles Ouellet, Trois-Rivières (CA)

(73) Assignee: LE GROUPE ROVIBEC INC., Sainte-Monique (CA)

( * ) Notice: Subject to any disclaimer, the term of this patent is extended or adjusted under 35 U.S.C. 154(b) by 0 days.

(21) Appl. No.: 17/179,889

(22) Filed: Feb. 19, 2021

(51) Int. Cl.
*A01J 5/003* (2006.01)
*A01J 7/04* (2006.01)
*A01K 1/12* (2006.01)

(52) U.S. Cl.
CPC .............. *A01J 5/003* (2013.01); *A01J 7/04* (2013.01); *A01K 1/12* (2013.01)

(58) Field of Classification Search
CPC ..... A01J 7/00; A01J 7/04; A01J 5/003; A01K 1/12
See application file for complete search history.

(56) References Cited

U.S. PATENT DOCUMENTS

| | | | |
|---|---|---|---|
| 2,678,627 A | 5/1954 | Kingston | |
| 2,742,876 A | 4/1956 | Duncan | |
| 4,034,711 A | 7/1977 | Bender et al. | |
| 4,763,605 A | 8/1988 | Braum | |
| 5,507,247 A | 4/1996 | Tecza et al. | |
| 5,768,997 A | 6/1998 | Meier | |
| 6,205,949 B1 | 3/2001 | van den Berg | |
| 6,349,028 B1 * | 2/2002 | Komatsu | H01G 9/022 361/504 |
| 6,814,026 B2 * | 11/2004 | Guo | A01K 1/12 119/14.02 |
| 7,086,348 B2 * | 8/2006 | Guo | A01J 5/0175 119/14.02 |
| 8,651,050 B2 * | 2/2014 | Rousseau | A01K 1/0613 119/14.04 |

(Continued)

FOREIGN PATENT DOCUMENTS

| | | |
|---|---|---|
| CA | 2958249 A1 | 2/2016 |
| EP | 0541517 B1 | 6/1997 |

(Continued)

*Primary Examiner* — Monica L Barlow
(74) *Attorney, Agent, or Firm* — Anglehart et al.

(57) ABSTRACT

An automatic animal processing device for automatically processing a domestic animal from its stall the animal while restraining the animal and without impeding passage in the aisle. The animal processing device, while operating, allows a person to walk-by the system with minimal constraints. The animal processing device may be a milking machine may be a milking machine having a milking head assembly and a cleaning system. The animal processing device may be mounted on a movable platform, such that the processing device may be automatically moved from one stall to the next. For installations in which the processing device is installed on tracks in the middle of two rows of animals, the processing device may be rotatable on its movable platform, such that it may process the animals of both sides of the aisle.

12 Claims, 10 Drawing Sheets

(56) References Cited

U.S. PATENT DOCUMENTS

| | | | | |
|---|---|---|---|---|
| 2009/0271033 | A1* | 10/2009 | Van Der Tol | A01J 5/003 |
| | | | | 700/245 |
| 2012/0048207 | A1* | 3/2012 | Hofman | A01J 7/04 |
| | | | | 119/651 |
| 2012/0272903 | A1* | 11/2012 | Hofman | A01J 5/0175 |
| | | | | 119/14.02 |
| 2013/0239897 | A1* | 9/2013 | Birk | A01J 5/007 |
| | | | | 119/14.04 |
| 2015/0107518 | A1* | 4/2015 | Anglart | A01J 5/003 |
| | | | | 119/14.02 |
| 2017/0231186 | A1 | 8/2017 | Rousseau et al. | |
| 2018/0116172 | A1* | 5/2018 | Kraaij | A01J 5/003 |
| 2019/0269096 | A1 | 9/2019 | Pinsky et al. | |

FOREIGN PATENT DOCUMENTS

| | | |
|---|---|---|
| EP | 0635204 B1 | 4/1999 |
| EP | 1145626 A2 | 10/2001 |
| WO | 2014/055001 A1 | 4/2014 |

\* cited by examiner

AUTOMATIC COW MILKING DEVICE

TECHNICAL FIELD

The present invention relates to an automatic animal processing device for controlling and restraining a domestic animal to perform a task upon it. In particular, the animal may be a cow and the task may be milking.

BACKGROUND

The raising of domestic animals, particularly cows, is a very demanding task. In the case of cows, they must be attended to on a daily basis for milking, cleaning and feeding. The milking is usually done several times a day. As such, a dairy farm with 100 or more cows is a very labour-intensive business. Usually, such dairy farms are operated and run by a family. Since the cows have to be attended to on a daily basis, along with the many other chores associated with such a farm, and because the herd of cows cannot be left unattended for long periods of time, the leisure activities of the family are quite restrained.

Modern milking machinery has been developed to facilitate the milking of cows, the feeding and the cleaning of stalls. U.S. Pat. No. 6,349,028 discloses an example of an automatic milking machine, in which a robotic arm is used for attaching a teat-cup to an animal's teat. However, physical labour is still required to herd the cows one-by-one into the apparatus and to precisely position each cow for the automatic milking. Although the milking is done automatically, such operation can be more labour-intensive in that the cows must be removed from their stalls, brought to the milking machine and then returned to the stalls afterwards. Accordingly, the benefits in terms of time saving are limited.

In order to alleviate the problem of shuttling the cows from their stalls to the milking apparatus, milking parlors have been developed, as described for example in U.S. Pat. Nos. 6,814,026 and 7,086,348. Typically, a milking parlor includes a shuttle stall which loads an animal thereon, backs it up to a milking station, advances the cow out of the milking station and releases it in a release area, at which point the cow needs to be either brought back to its stall and repositioned therein or released outdoors to pasture. This is again labour intensive, since the cows must be herded or removed from their stalls, manually positioned and secured on the shuttle stall, and then returned to their stalls after the milking process is complete. Furthermore, the stall arrangements often create traffic jams, since the cows must be displaced in front of shuttle stalls which are occupied during the milking process.

U.S. Pat. No. 8,651,050 describes an automatic animal retrieving platform that has a confining means in the form of a cage with an opening and a separate extendible retrieving means. The platform assembly includes a displaceable floor that extends to the rear of the stall and retrieving arms that grasp the animal and cause it to back up slowly onto the platform and therefore into the cage via the opening, where the animal is confined in the cage of the platform assembly. Once the animal is confined in the cage, the platform assembly is able to perform a job function on the animal, such as for example the milking of a cow. Such an automatic animal processing device can significantly reduce the job functions of the operators of a milking farm, since human labour is not required to remove cows from their private stalls, herd them to a milking parlor and then return them to their stalls.

However, the previously described machine is a bulky and can be difficult or impossible to use and maneuver in smaller spaces or spaces with a low ceiling. As such, this type of machine may be unsuitable for smaller dairy farms. This machine also has very limited ability to adjust its operation and components (e.g. retrieving arms) for animals above a certain height and is not capable of dealing with animals above a certain height. Furthermore, it is difficult to maintain the necessary cleanliness of the machine and all of its various parts in order to avoid contamination, as required to meet hygienic standards in the milking industry for example. Finally, being able to milk only one cow at a time, the machine is limited in terms of the number of cows it can process.

In order to overcome the limitations of the previously described machines, the Applicant developed and patented an improved automatic milking device. Canadian Patent No. 2,958,249 describes this automatic animal processing device which is mounted on tracks in the aisle between two rows of cow stalls. The described machine automatically moves between cow stalls and is operable to restrict a cow's movement such that the cow moves backwards (i.e. towards the aisle). Once positioned over a displaceable bridge, the animal can be safely processed by a processing device. The automatic processing device described in this patent is efficient, mainly due to the fact that it can process two animals at the same time (i.e. from stalls on both side of the aisle) and can be fully automated. However, the automatic processing device is bulky and necessarily blocks the aisle, impeding the ability for a human to pass-by the device and therefore limiting the possibilities of other work to be done inside the barn while the processing device is automatically processing the animals. Additionally, although the animals can be processed in their own stalls, they are still required to be positioned over the milking device, which is done by restricting side movements of the cow while retracting frontal bumpers such that the cow backs up to the required position.

There thus exists a need in the industry for improvements that provide improved automatic animal processing capabilities.

SUMMARY

Applicant has found that the operations of automatically processing animals and other operations of the farm may be significantly improved by the use of the new automatic animal processing device as described herein. As a matter of fact, the new automatic cow milking device may be used to milk the animals without requiring any movement from the animal. By using a deployable structure being operable to move the processing unit over multiple axis, the processing unit may be positioned directly under the animal without needing the animal to be moved to a specific location. This presents multiple advantages over the prior art solutions, as it reduces the time to process an animal and it reduces the probability of an animal adversely affecting the processing by rocking the processing device (e.g. compared to requiring the animal to be on a bridge which may be on an uneven floor).

Furthermore, the operations of the farm may also be significantly improved with the processing device disclosed herein as it allows for a person to pass-by the device while it is in operation. As such, the person may perform any other required tasks inside the barn without being limited by the operations of the processing device. In order to allow for a person to walk next to the processing device, the processing device may only process a single animal in a stall. However, the improved automatic processing device detailed herein may be mounted on a rotatable base, such that, once it has completed the processing of all animals on one side of the aisle, it may rotate and process the animals on the other side of the aisle.

As all the processing may be done automatically, the additional time required to process all the animals on both sides of an aisle, when compared to an automatic device which can process both sides at once, may have a negligible impact on the work time of the person operating the farm.

A first broad aspect is a vehicular animal processing device for automatically milking a domestic animal that is in a stall, the animal processing device comprising: a vehicular base automatically displaceable in an aisle of a stall environment to the rear opening of the stall; a frontal movement restriction system mounted on a movable top structure comprising a top structure displacement mechanism operable to displace the frontal movement restriction system to a position in front of the animal; a rear movement restriction system configured to rest on the animal's rump; a deployable support structure mounted to the base and having a horizontal displacement mechanism operable to displace the support structure to extend into the stall and to retract from the stall for movement between stalls; and a processing unit rotatably mounted on a mechanical arm, wherein the mechanical arm is mounted to the support structure and movable in a height direction, to automatically position the processing unit at a desired location under the domestic animal, wherein, when the deployable support structure is displaced to position the processing unit at a desired location under the domestic animal, passage across the vehicular base is unimpeded by the deployable support structure and the processing unit.

In some embodiments, the vehicular animal processing device further comprises a trolley mounted on the deployable support structure, wherein the mechanical arm is mounted on the trolley, the trolley being movable over a length of the deployable support structure and the mechanical arm being movable in a height direction.

In some embodiments, the vehicular animal processing device further comprises at least one ground engaging wheel configured to support the deployable support structure.

In some embodiments, the vehicular animal processing device further comprises a deployable rear leg positioning system configured to ensure a minimum separation distance between the domestic animal's hind legs.

In some embodiments, the vehicular animal processing device further comprises a deployable lateral positioning system configured to position an adjacent animal in an adjacent stall on a far side of the adjacent stall.

In some embodiments, the deployable support structure is connected to the movable top structure and the displacement mechanism is the top structure displacement mechanism.

In some embodiments, the deployable support structure is rotatably mounted to the vehicular base to position the processing unit towards an opposed stall on the opposed side of the aisle.

In some embodiments, the processing unit comprises individually controllable teat connectors operable to be automatically positioned at the animal's teats when the processing unit is at the desired location under the domestic animal.

In some embodiments, the processing unit further comprises a teat cleaning device.

In some embodiments, the vehicular animal processing device further comprises a container to store milk processed by the processing unit.

In some embodiments, the processing unit is automatically positioned at the desired location under the domestic animal by a laser guidance system.

In some embodiments, the processing unit is automatically positioned at the desired location under the domestic animal by a camera guidance system.

A second broad aspect is a vehicular animal processing device for automatically milking a domestic animal that is in a stall, the animal processing device including: a vehicular base automatically displaceable in an aisle of a stall environment to the rear opening of the stall; a deployable support structure mounted to the base and having a horizontal displacement mechanism operable to displace the support structure to extend into the stall and to retract from the stall for movement between stalls; a trolley mounted on the deployable support structure, wherein the trolley is movable over a length of the deployable support structure; and wherein, when the deployable support structure and the trolley are displaced to a desired location with regards to the domestic animal, passage across the vehicular base is unimpeded by the deployable support structure.

BRIEF DESCRIPTION OF THE DRAWINGS

The invention will be better understood by way of the following detailed description of embodiments of the invention with reference to the appended drawings, in which.

DETAILED DESCRIPTION

The present disclosure pertains to an improved automatic animal processing device, such as an automatic cow milking device. While the main context presented in this disclosure is one of a dairy farm, the processing device being a milking device, it will be understood that other types of processing devices may be alternatively used without departing from the teachings herein. As a matter of fact, the processing unit (i.e. the apparatus being appended to the animal processing device, for example the milking head) may be changed to any type of processing unit.

Figure 1:
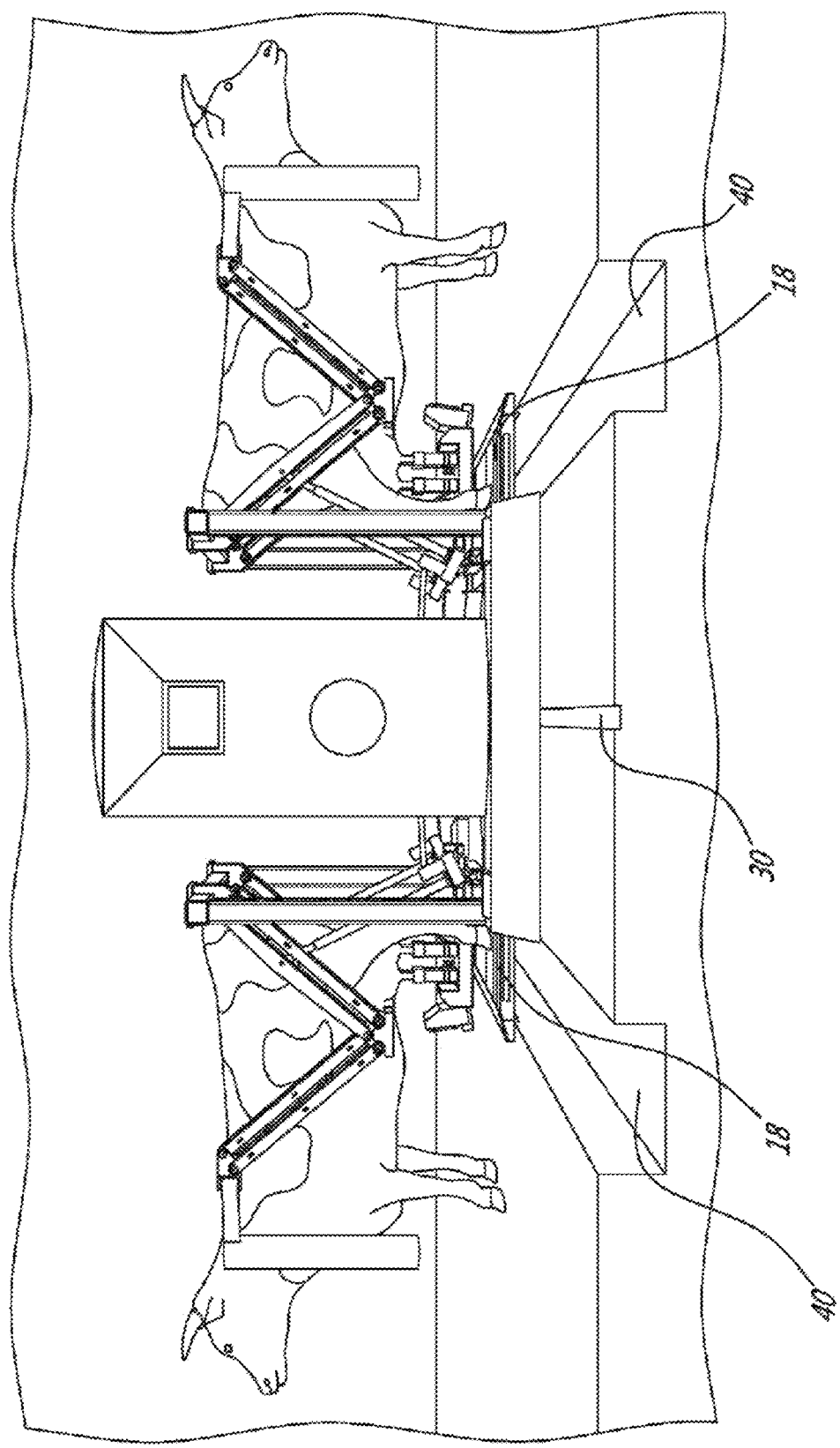
FIG. 1 is a side view of an exemplary prior art automatic animal processing device in which the device is mounted centrally over an aisle, the processing device being operable to process two animals at the same time.

Now referring to FIG. 1, which is a side view of an exemplary prior art automatic animal processing device in which the device is mounted centrally over an aisle, the processing device being operable to process two animals at the same time. As detailed herein, while this prior art processing device may be efficient to quickly process all animals on both sides of an aisle, it presents several significant disadvantages for operations in its environment, particularly in a dairy farm environment. Mainly, prior art devices, as the one shown in FIG. 1, generally take up all the available space of the aisle between two rows of animal stalls. This prevents all manual operations by a person inside the immediate environment of the device. For example, the use of this type of device may prevent a person from cleaning all the stalls of the aisle while the device is operating. Several operations may require a person to move between stalls (e.g. animal health monitoring, feeding, cleaning, etc.) and each may be impeded by the device if these manual operations are completed quicker than the device moves between stalls.

Moreover, prior art automatic animal processing devices generally requires some movement of the animal in order to align it with the processing unit. For example, the prior art device of FIG. 1 requires cows to move backwards over a bridge (i.e. a structural part over the gutter between the stalls and the aisle). Once the animal is over this part, the processing unit may be located beneath the animal at the desire place (e.g. beneath the animal's teats for a milking unit). Other prior art devices require the animals to move completely out of its stall (e.g. to a milking parlor). Requiring movement of the animal in order for it to be placed specifically above a given device may lead to issues, such as damage to the device (if the animal rocks, kicks, or otherwise strongly pushes against the machine) or longer processing time as the animal may take a long time before being correctly positioned.

As such, the operations of the farm may be significantly improved by an automatic animal processing device operable of similar functions as the ones of the prior art devices, while allowing a person to walk and pass-by the device during its operation. As such, the person may perform any other required tasks inside the barn without being limited by the operations of the processing device. In order to allow for a person to walk next to the processing device, the processing device may only process a single animal in a stall. However, the improved automatic processing device detailed herein may be mounted on a rotatable base, such that, once it has completed the processing of all animals on one side of the aisle, it may rotate and process the animals on the other side of the aisle. As all the processing may be done automatically, the additional time required to process all the animals on both sides of an aisle, when compared to an automatic device which can process both sides at once, may have a negligible impact on the work time of the person operating the farm.

Additionally, processing of the animals may be improved by a processing device which may not require any movement from the animal or minimizes the required movements from the animal. As a matter of fact, not requiring the animal to move to a specific location may save several minutes of processing time per animal, thus resulting in significant time saving for the processing of tens of animals.

By using a deployable structure being operable to move the processing unit over multiple axis, the processing unit may be positioned directly under the animal without needing the animal to be moved to a specific location. This presents multiple advantages over the prior art solutions, as it reduces the time to process an animal and it reduces the probability of an animal adversely affecting the processing of the device.

In the preferred embodiment presented herein, the processing unit is a milking head and the processing of the animal is milking a cow. The milking head may be a standard automatic milking head unit, such as Fullwood's M2erlin robotic milking machine. A person skilled in the art will appreciate that the processing device described herein may be adapted to accommodate different automatic milking head units without departing from the teachings of the present disclosure. For example, a GEA milking head may be similarly mounted and operated.

Figure 2:
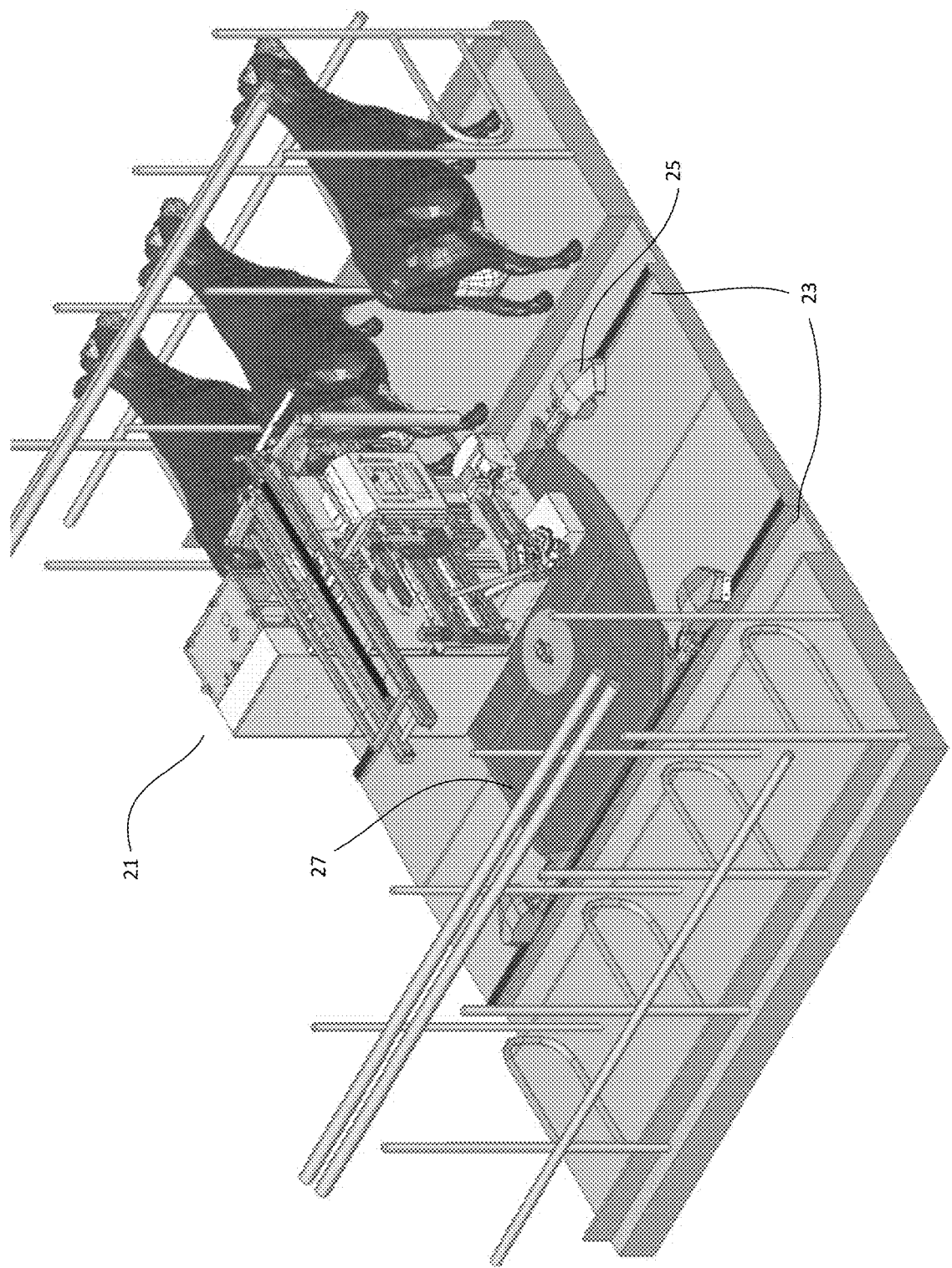
FIG. 2 is an isometric view of an exemplary automatic animal processing device rotatably mounted over a movable base, the processing device being in a retracted position.

FIG. 2 illustrates an exemplary automatic animal processing device 21 according to one embodiment of the present disclosure. The automatic animal processing device 21 may be rotatably mounted on a base, such that the device's base plate 27 may rotate and process animals on either side of the aisle in which it is installed. In addition to being rotatable, the device's base plate 27 may be mounted on aisle tracks 23 with a rolling mechanism 25. This may allow the processing device to move from one stall to the next. Although not specifically shown in FIG. 2, a person skilled in the art will appreciate that the translational movement between stalls may be imparted to the processing device 21 by any means as is well known in the art (e.g. motorised central rack-and-pinion, motorised wheels in the rolling mechanism 25, etc.).

FIG. 2 shows the processing unit of the processing device 21 in a retracted position, such that the processing unit and its supporting mechanisms are fully retracted. When retracted, thus not operating, these mechanisms may partially block the passage next to the processing device 21. As such, it may not be practical for a person to pass-by the device 21 while the device 21 is not in operation (i.e. when the device is not milking a cow). However, a person skilled in the art will appreciate that other embodiments with retractable beam structures may allow the processing unit and its support structure/mechanisms to stay within the extent of the processing device 21 such that the passage is not obstructed.

As will be further detailed herein, the top structure providing the mechanism for the animal's frontal movement restriction (e.g. frontal bumper) may be at a height providing clearance for a height of an average person. As such, the top structure may be at a height of more than 6 feet, such that a person may comfortably walk underneath without bending.

Figure 3:
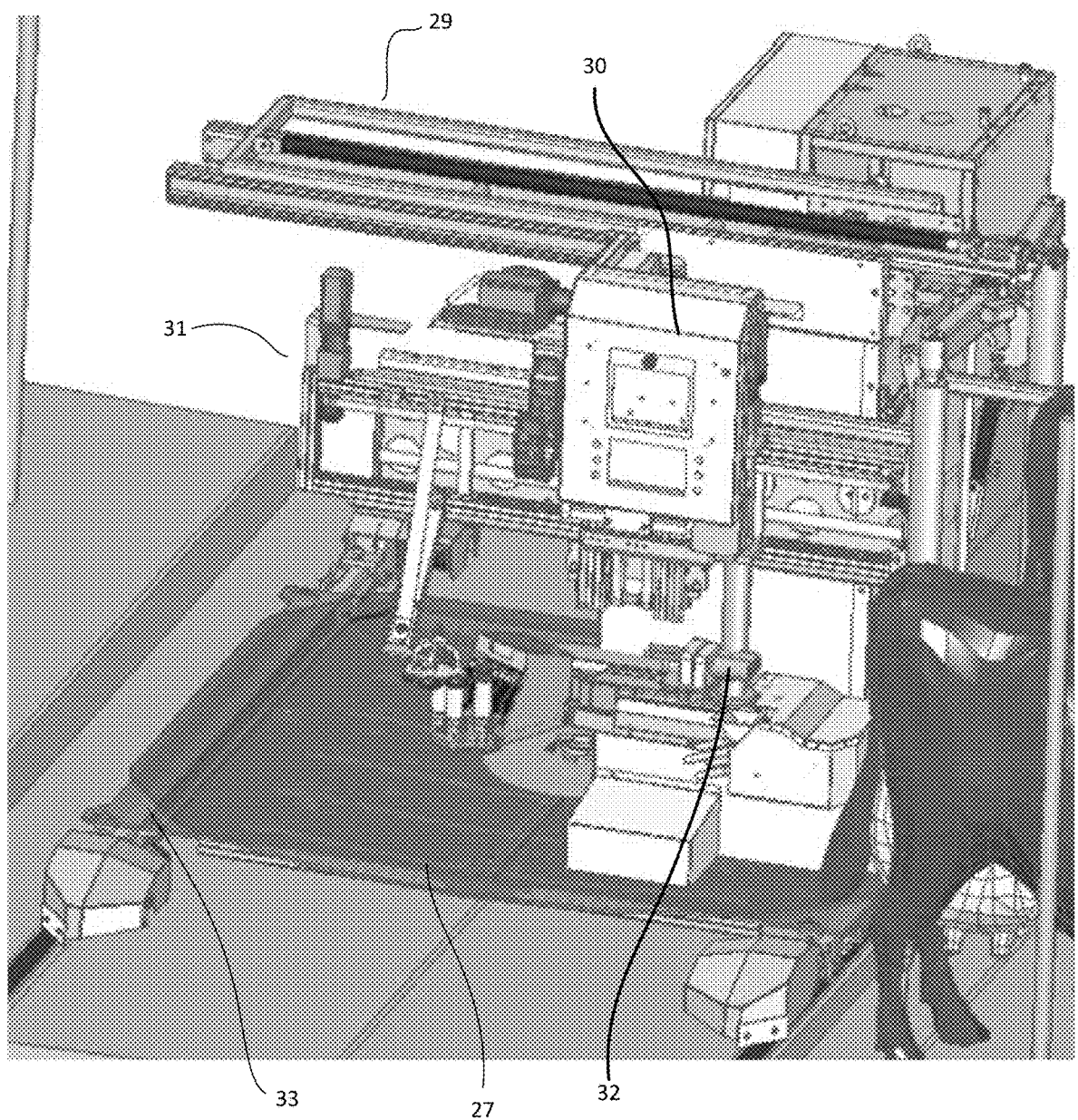
FIG. 3 is a side view of an exemplary automatic animal processing device rotatably mounted over a movable base, the processing device being in a retracted position.

Now referring to FIG. 3 which is a side view of an exemplary automatic animal processing device. FIG. 3 shows the retracted position of the processing unit and its partial obstruction of the aisle. The top structure 29 may include support beams providing structural support for the parts of the mechanism which provides the animal's frontal movement restriction system. As such, the support structure may support a movable structure and a displacement mechanism (e.g. linear motor/actuator or the equivalent to provide a translational movement to the movable structure) operable to change a position of the movable structure in relation to the support structure, such that the animal's frontal movement restriction system (e.g. frontal animal controlling mechanism with frontal bumpers) may be moved to rest on the animal's shoulders. Once deployed, the animal's frontal movement restriction system may thus limit the movement of the animal inside the stall, such that the animal may be safely processed. While described as a frontal movement restriction system, a person skilled in the art will understand that the movement restriction system may further limit lateral movements of the animal at the same time. As such, the movement restriction system may include additional restriction bars than the frontal bumpers shown in FIG. 3. For example, there may be at least one side restriction bar, such that the animal is gently pushed and restrained to a side of the stall (i.e. the side opposed to where the automatic animal processing device is deployed in the stall). Therefore, as the movement restriction system is deployed, the animal may be urged against the side railings of the stall while being restricted to move forward or backwards.

The automatic animal processing device may have a control terminal 30, such that the device's parameters may be set and changed directly on the device. A person skilled in the art will appreciate that the parameters may be set and changed wirelessly (e.g. through a dedicated wireless device, a mobile device, a tablet, etc.) without departing from the teachings of this disclosure. As a matter of fact, a wireless communication module may be included in the control terminal 30 to allow wireless communication to a dedicated device or to any type of mobile device or computing device running a specific application or computing program providing control of the device. Additionally, the control terminal 30 may show any data and statistics relevant to the operation of the processing device 21 (e.g. quantity of milk processed, time spent, etc.). The data may be presented on a display panel on the control terminal 30.

The control terminal 30 may also be operable to control the automatic operation of the processing device and the processing unit. As such, the control terminal 30 may include all required electronic components to store data, receive data, process data and output resulting data to other components of the processing device. The control terminal 30 may therefore include a processor, volatile and non-volatile memory, a display, input/output (I/O) interface (which may include a user interface), wireless communication interface, etc. The control terminal 30 may thus accept inputs such as user inputs (e.g. specifying operation parameters), sensor inputs and any other data communicated from other parts of the processing device. The control terminal 30 may thereafter utilize the inputs to provide the controls to all the systems (e.g. device positioning system, processing unit positioning, operation of the pump, etc.; as will be further described in FIG. 7) of the processing device such that it may operate in an automatic fashion (i.e. without intervention from a person).

As will be further described herein, the processing unit may be mounted on a processing unit support structure 31. The processing unit support structure 31 may allow the displacement of the processing unit inside and out an animal stall and a vertical displacement to position the processing unit below any animal, at the desired location.

The top structure 29 may further provide support to one end of the processing unit support structure 31, such that it may limit the potential sag of the processing unit support structure 31 when deployed in the animal's stall. As will be further detailed herein at the description of FIG. 4, the processing unit support structure 31 may thus be supported on one end by the enclosure 38 and at the other end by the top structure 29. As one end of the processing unit support structure 31 may be fixed to the movable structure of the top structure 29, a displacement of the movable structure of the top structure 29 inside the animal's stall may simultaneously deploy the processing unit support structure 31 on the side of the animal.

While the preferred embodiment, connects the movable structure of the top structure 29 to one end of the processing unit support structure 31, a person skilled in the art will appreciate that alternative configurations may be used. As such, the processing unit support structure 31 may be simply supported at the enclosure 38 if the support structure is sufficiently reinforced to limit the sag of the processing unit at the distal end to an acceptable limit. The processing unit support structure 31 may alternatively be supported by a wheeled leg at its distal end. In such embodiments, the processing unit support structure 31 may itself be motorized to be deployed inside the animal's stall. The preferred embodiment, in which the processing unit support structure 31 is supported at its distal end by the top structure however present the significant advantage of having a single actuator to deploy both the frontal bumpers and the processing unit support structure 31 in the animal stall while not being prone to being detrimentally affected by the environment (compared to a wheeled leg in which the wheel may accumulate bedding material and manure).

The processing unit support structure 31 may act as a gantry over which the mechanical arm supporting the processing unit may be mounted as a trolley. As such, the mechanical arm may be moved independently along the length of the processing unit support structure 31 as well as in a perpendicular direction (i.e. a height direction).

As shown in FIG. 3, the processing unit may include a teat cleaning apparatus 32. The teat cleaning apparatus 32 may be a dual brush device in which the rotation of the brushes cleans the animal's teats. The dual brush may clean both sides of each teats at a time, such that the milk being milked from the animal may be free of contaminants generally found in a stall environment (e.g. manure, bedding material, etc.). The teat cleaning apparatus 32 may be mounted on a rotatable arm, such that it may be positioned over the processing unit's arm in a stowed position and be rotated to be positioning under the animal's teats when in operation. The teat cleaning apparatus 32, as illustrated in FIG. 3, is in a stowed position. The teat cleaning apparatus 32 may be equipped with water nozzles to spray water on the brushes and the animal's teats in order to improve the cleaning.

As described herein, the processing device 21 may be rotatably mounted to a base plate 27. The base plate 27 may be rotated over the structural base 33, such that the whole processing device 21 may be rotated without having to rotate the track mounted rolling mechanism (i.e. similar to a turntable).

A person skilled in the art will understand that the described mechanism and structure may be equivalently replaced by any similar structure or mechanism providing the same function without departing from the teachings of this disclosure. For example, the rotating mechanism of the base plate 27 may be replaced by a rotating system in which the whole rolling mechanism is rotated (e.g. at the ends of the aisle in which the device is installed, there may be a rotating floor plate allowing the whole device and base to be rotated before being connected once more to the aisle's tracks).

Figure 4:
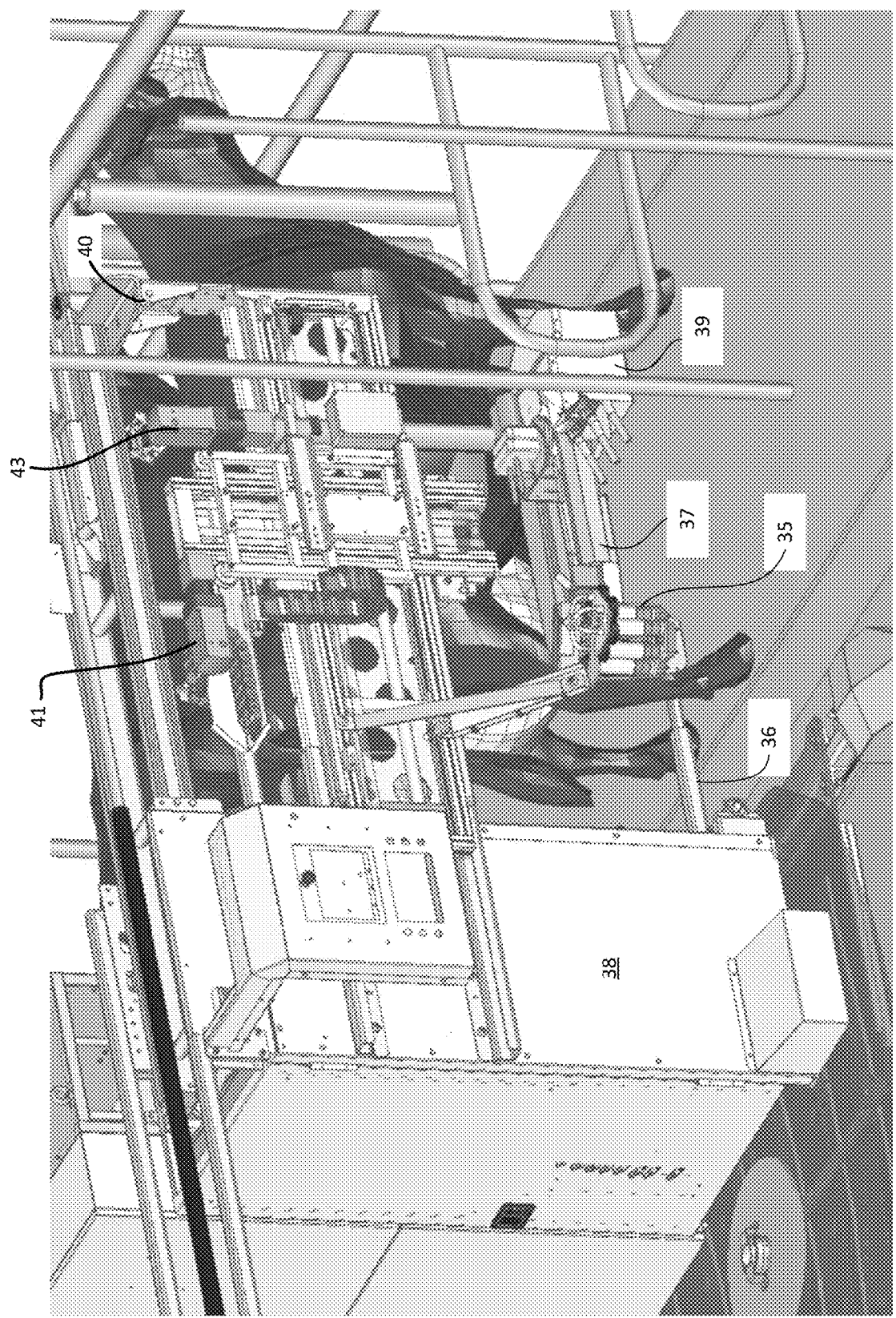
FIG. 4 is a side view of an exemplary automatic animal processing device rotatably mounted over a movable base, the processing device being partially extended next to an animal to be processed.

Now referring to FIG. 4 which is a side view of an exemplary automatic animal processing device with the processing device being partially. The automatic animal processing device 21 may be equipped with a number of systems enclosed within one of the enclosure 38. These systems may include the pump required to pump milk (i.e. if the processing unit is a milking unit), a reservoir to receive and store milk, power electronics for providing the processing device's systems with necessary power, etc.

As described herein, the processing unit support structure 31 may provide support for the mechanical arm structure on which is attached the processing unit. The mounting of the mechanical arm structure may include a trolley structure which may be moved on the lengthwise direction of the processing unit support structure 31 and in a height wise direction. Therefore, the mechanical arm structure may move and position the processing unit (e.g. the milking head) at a desired depth inside the animal stall as well as at a desired height with regards to the height of the animal's teats. Displacement of the processing unit in multiple axis is thus achieved. As such, the mechanical arm's trolley may include a motor (linear actuator or a motor providing the same functionalities) for the translation of the unit inside and out of the animal's stall, i.e. processing unit depth motor 41, and a similar motor to provide vertical displacement of the processing unit, i.e. the processing unit vertical motor 43.

In the embodiment of FIG. 4, the processing unit is a milking unit. As such, the processing unit includes a teat connectors 35 to interface with a cow's teats and thereafter milk the cow when the pump functions. The teat connectors 35 may include a positioning mechanism allowing each individual teat connector to have its position and angular orientation changed to mate with the animal's teats. The automatic processing system may thus connect each individual teat connector of the teat connectors 35 in succession, by adjusting the individual position of each teat connector to match the animal's teats. These adjustments may be done based on readings from a laser positioning system, a video (i.e. camera) positioning system or any other automatic positioning system as is known in the art. The teat connectors 35 may include water nozzles operable to wash the animal's teats once the milking has been completed and the individual teat connectors have been disconnected from the animal's teats. The processing unit's arm 37 may provide structural support for the teat connectors 35 while including all necessary pipes and hoses required for the operations of the processing unit. As such, the processing unit's arm 37 may include water pipes and milk pipes.

In this embodiment, the automatic animal processing device includes an animal rear leg positioning system 36 which may be deployable to contact the ground between the animal's rear legs. As such, the animal rear leg positioning system 36 may provide a means to control the rear lateral movement of the animal being processed, as an animal moving their rear legs laterally would come into contact with the animal rear leg positioning system 36. The animal rear leg positioning system 36 may further ensure that the animal's rear legs are separated by a minimal distance required to safely and optimally operate the processing unit. As such, when the animal rear leg positioning system 36 is deployed, which may be done by a rotation of its base, the animal's rear legs may be pushed outwardly.

In some embodiments, the animal rear leg positioning system 36 may further be used to attach different devices and/or sensors to supplement the operations of the automatic animal processing device. As such, the animal rear leg positioning system 36 may include a camera facing upwards (or any other sensor to help in positioning the processing unit's arm 37, e.g. laser positioning system), a temperature sensor (e.g. laser sensor) to help assess the animal's health, etc. The animal rear leg positioning system 36 may further include a stall cleaning apparatus.

The teat connector 35 may thus be connected to the milk pipes such that the milk may be collected and stored in a container inside the enclosure 38. As such, there may be a number of pumps, such as at least one providing a means to transfer collected milk from the teat connector 35 to the enclosure 38. For milking operations, a second pump may be required to provide the milking force to the animal's teats. Enclosure 38 may further include a clean water reservoir which may provide the water required to clean the animal's teats and for the teat cleaning apparatus.

A person skilled in the art will understand that while the milk may be stored in a milk container inside the enclosure 38, the milk may alternatively be transported to a storage not included in the automatic animal processing device 21. As a matter of fact, the device may be connected to a network of flexible hoses generally installed in the ceiling of the barn, such that the processed milk may be automatically sent to a storage. As such, the person overseeing the operation of the automatic milking device may not be required to manually empty the milk container comprised within the enclosure 38.

The mechanical arm's rotating fixture 39 may be attached to the mechanical arm's fixed vertical beam which connects the processing unit to the trolley supported by the processing unit support structure 31. As such, the rotating fixture 39 may include a motor operable to rotate the processing unit's arm 37 around the axis that is the mechanical arm's fixed vertical beam. The rotating fixture 39 may further include cleaning nozzles which may provide a water jet to clean the teat cleaning apparatus and the teat connectors 35.

Figure 5:
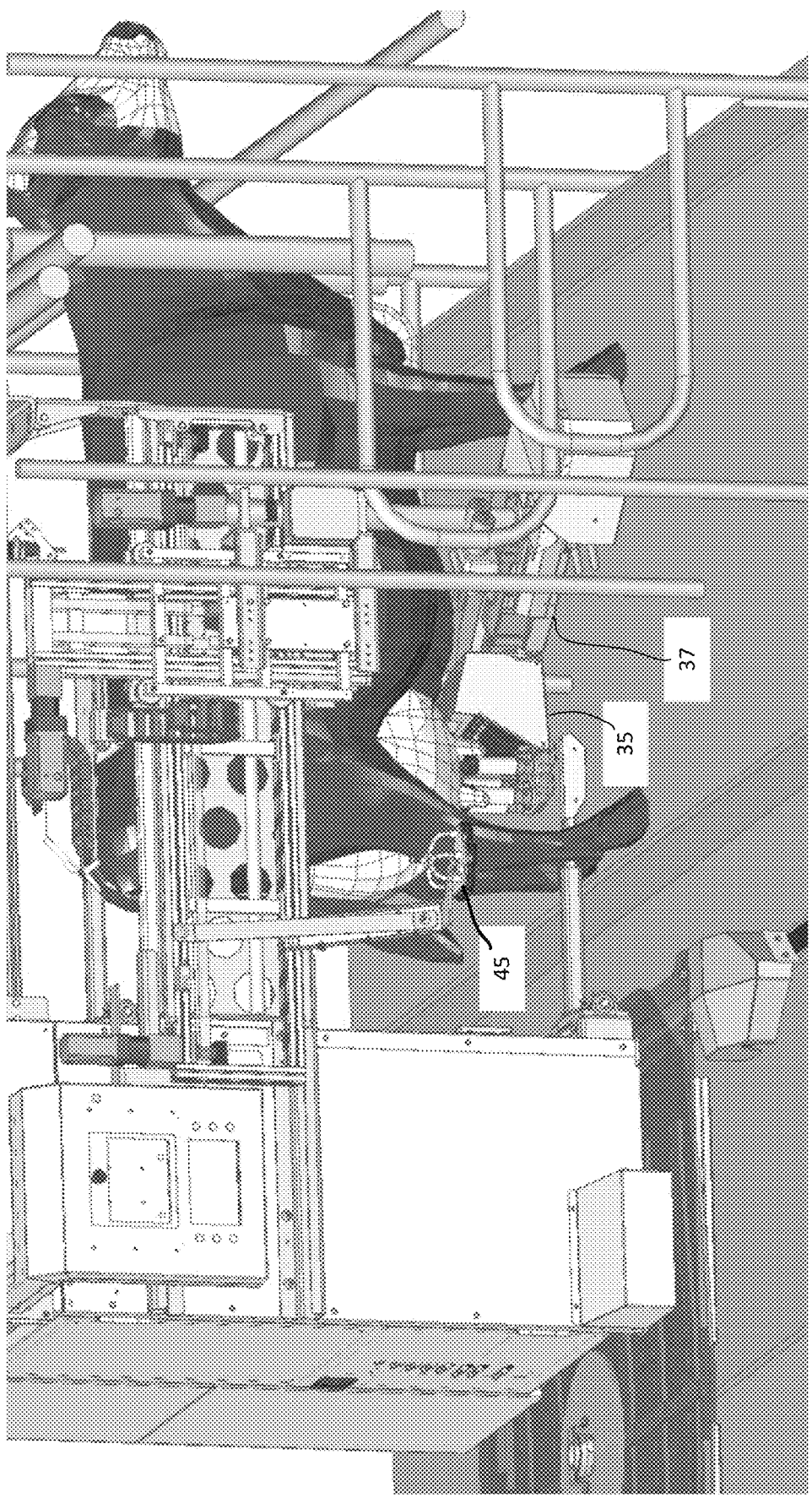
FIG. 5 is a side view of an exemplary automatic animal processing device rotatably mounted over a movable base, the processing device being positioned to process the animal.

FIG. 5 illustrates the exemplary automatic animal processing device positioned to process the animal. As such, the teat connectors 35 of the processing unit is connected to the animal's teats to process it. As illustrated, the processing unit has been automatically positioned in depth, height and rotation to be placed in an operative position. With these degrees of freedom in which the processing device may displace the processing unit, the processing device may be operable to process any types of animal of any height and length.

As illustrated in FIG. 5, the automatic animal processing device may further include a conduit cleaning system 45. The conduit cleaning system 45 may connect to each individual teat connector of the teat connectors 35 and flush the teat connectors 35, along with the milk conduits inside the processing unit's arm 37, with clean water or with compressed air. The rotating fixture 39 may include an outlet to allow the flushed fluids to drain from the mechanical arm. Cleaning of the milk inside the conduits and the teat connectors 35 may be necessary to ensure meeting regulatory sanitary requirements.

Although the processing unit's arm 37 is described as being mounted on a trolley moving along a deployable support structure 31, a person skilled in the art will appreciate that the processing unit's arm 37 may otherwise be mounted on a ground engaging deployable structure without departing from the teachings of this disclosure. For example, the ground engaging deployable structure may be displaced by one or more motorised wheels which may move the processing unit's arm 37 at a desired position with regards to the animal's teats such that the processing may be done.

Figure 6A:
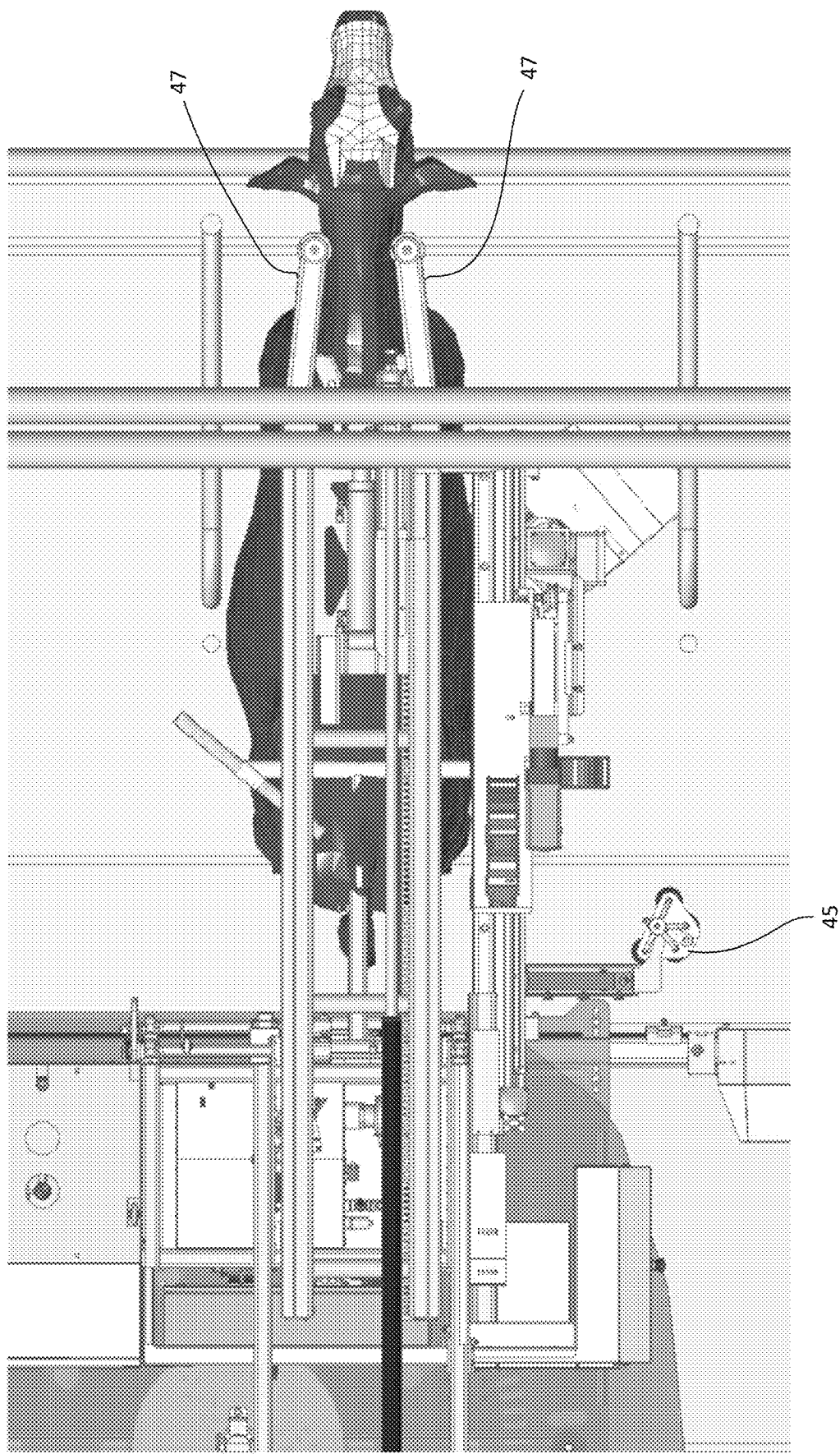
FIG. 6A is a top view of an exemplary automatic animal processing device rotatably mounted over a movable base, the processing device being positioned to process the animal.

Now referring to FIG. 6A which is a top view of the exemplary automatic animal processing device. In this embodiment, the engagement of the animal's frontal movement restriction system 47 may be seen in its deployed state. The animal's frontal movement restriction system 47 may include two cylindrical bumpers to rest on the animal's chest such that the animal may not be tempted to move forward during the processing. Similarly, as illustrated in the following figures, a rear restriction system may further limit the animal's movements towards the rear. The rear restriction system may thus include a bar resting on the animal's rump, such that the animal may not move further backwards. Therefore, the animal being restricted by the frontal movement restriction system 47 may be urged backwards until the animal's rump rests on the rear restriction system. As such, each animal being processed may thus be moved to an optimal position with regards to the possible movement of the processing unit.

Figure 6B:
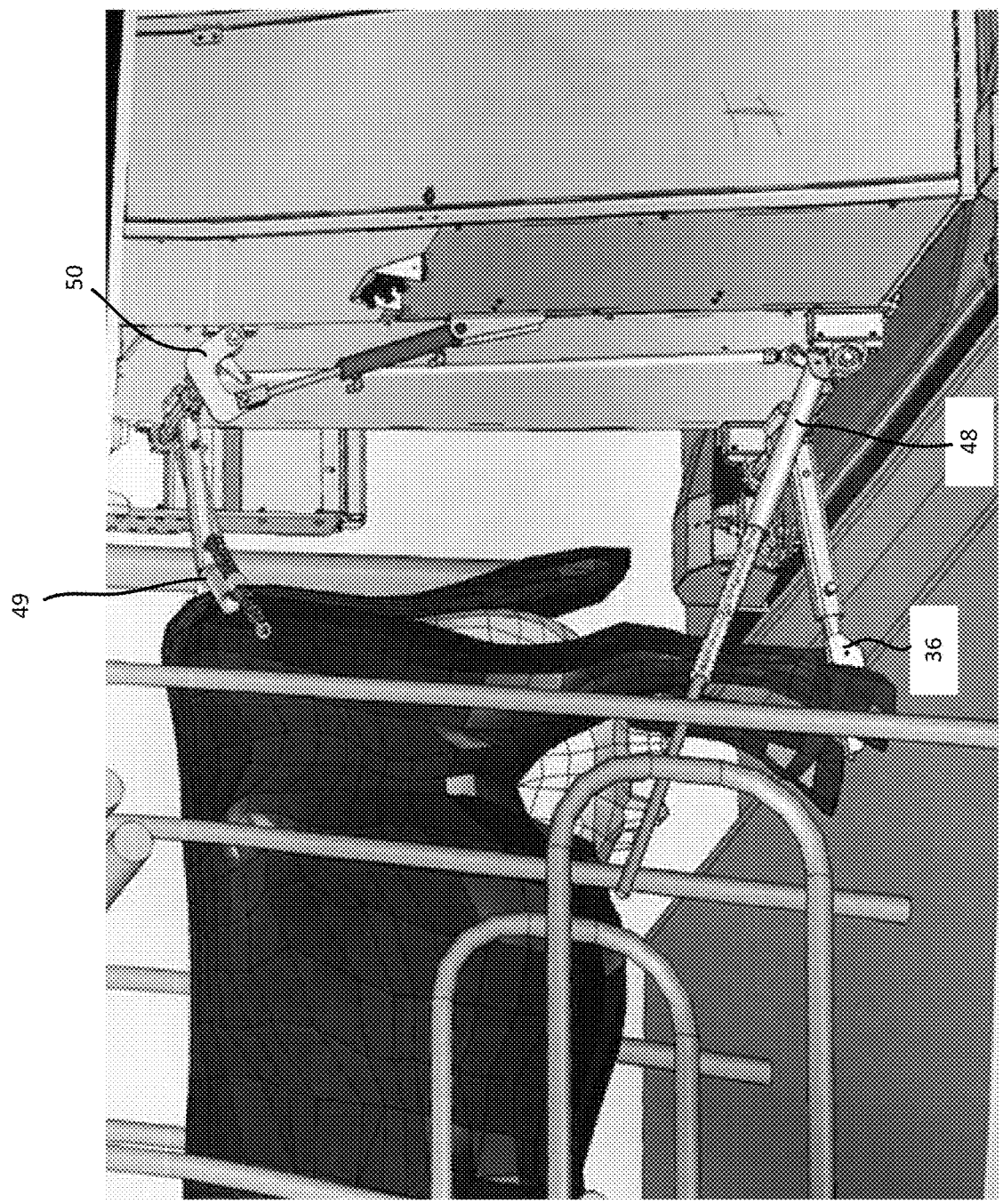
FIG. 6B is a side view of an exemplary automatic animal processing device rotatably mounted over a movable base having the rear animal positioning systems deployed.

FIG. 6B illustrates the rear animal positioning systems deployed. The rear animal positioning systems may include the animal rear leg positioning system 36, which ensure a minimal separation between the animal's hind legs, and a rear movement restriction system 49. As detailed herein, the rear movement restriction system 49 may push the animal on its rump, such that the animal's position is optimal for the operation of the processing unit. The animal may thus be in a position in its stall such that its hind legs are clear of the gutter running at the back of the stall. The combination of the rear and front animal restriction systems may therefore ensure that the automatic processing device may process any animal regardless of its length, as it would always position the animal against the rear movement restriction system (i.e. the distance between the animal's rump and the automatic processing device may thus be constant).

The deployment mechanism 50 for the rear animal positioning systems may be effected through a single actuator imparting a rotation on both base shafts on which are mounted the animal rear leg positioning system 36 and the rear movement restriction system 49. For example, the actuator may be a piston mounted to the base shaft on which the rear movement restriction system 49 is mounted, such that when the piston is displaced, the base shaft rotates. The base shaft of the rear movement restriction system 49 may be connected to the base shaft of the animal rear leg positioning system 36 by a vertical member fixed at both end, such that rotations are reciprocated in both shafts. The bottom shaft, on which the animal rear leg positioning system 36 is fixed, may further include an animal lateral positioning system 48. The animal lateral positioning system 48, when deployed by the rotation of the bottom shaft, may force a lateral movement of the animal in the adjacent stall, such that the animal in the adjacent stall is pushed towards the far side of its stall. The animal lateral positioning system 48 may therefore prepare the position of the next animal to be processed by the automatic animal processing device.

While the deployment mechanism 50 is described as being operated by a single actuator, a person skilled in the art will appreciate that any other means of displacing the positioning and restricting systems may be used without departing from the teachings of this disclosure. For example, each part may be actuated by its own actuation system and/or the deployment mechanism may use a motor.

Figure 6C:
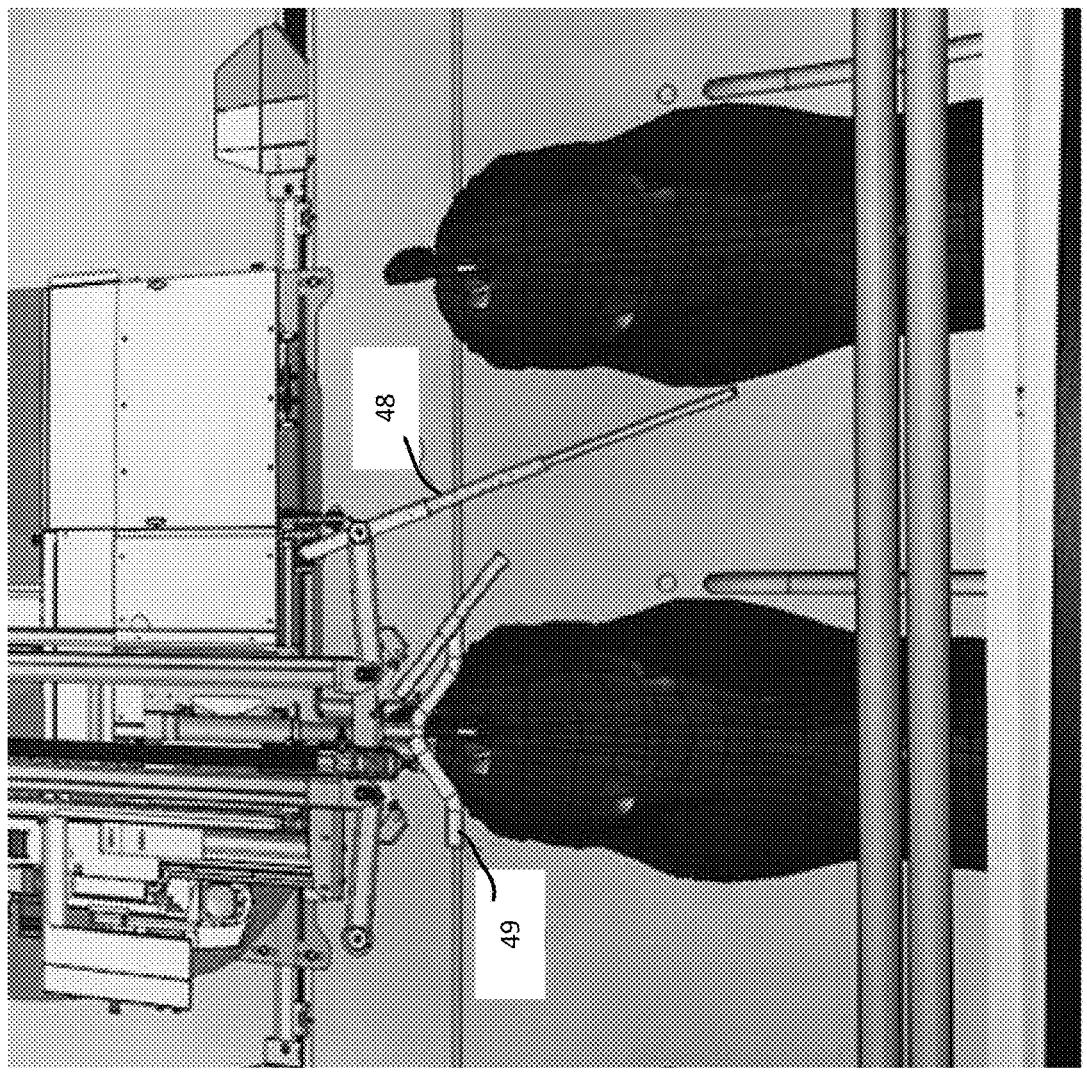
FIG. 6C is a top view of an exemplary automatic animal processing device rotatably mounted over a movable base having the rear animal positioning systems deployed.
Figure 6D:
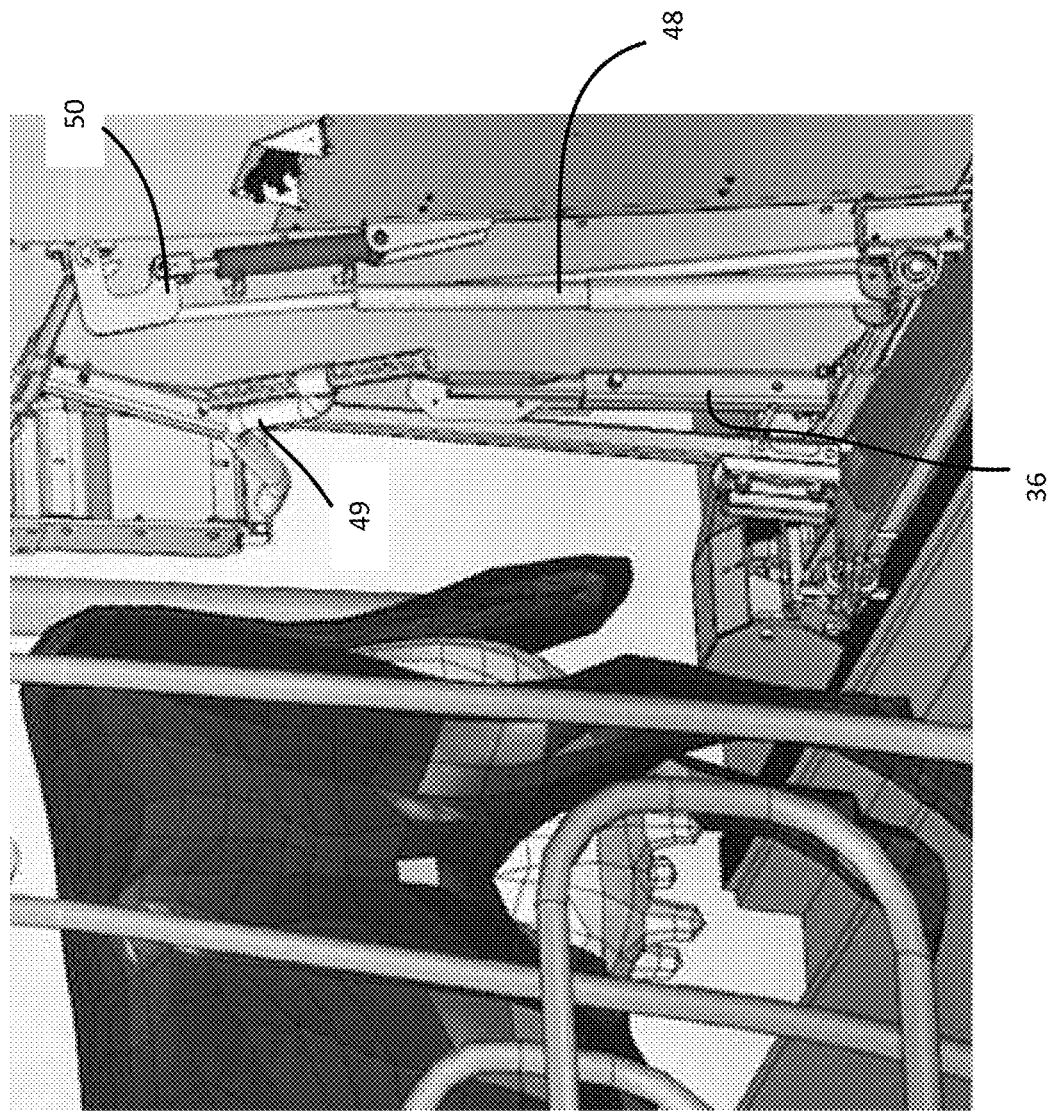
FIG. 6D is a side view of an exemplary automatic animal processing device rotatably mounted over a movable base having the rear animal positioning systems in a stowed configuration.

The positioning and restricting systems described in FIG. 6B are further illustrated in FIG. 6C which shows a top view of the rear animal positioning systems deployed and in FIG. 6D which is a side view of the rear animal positioning systems in a stowed configuration.

Figures 7, 8:
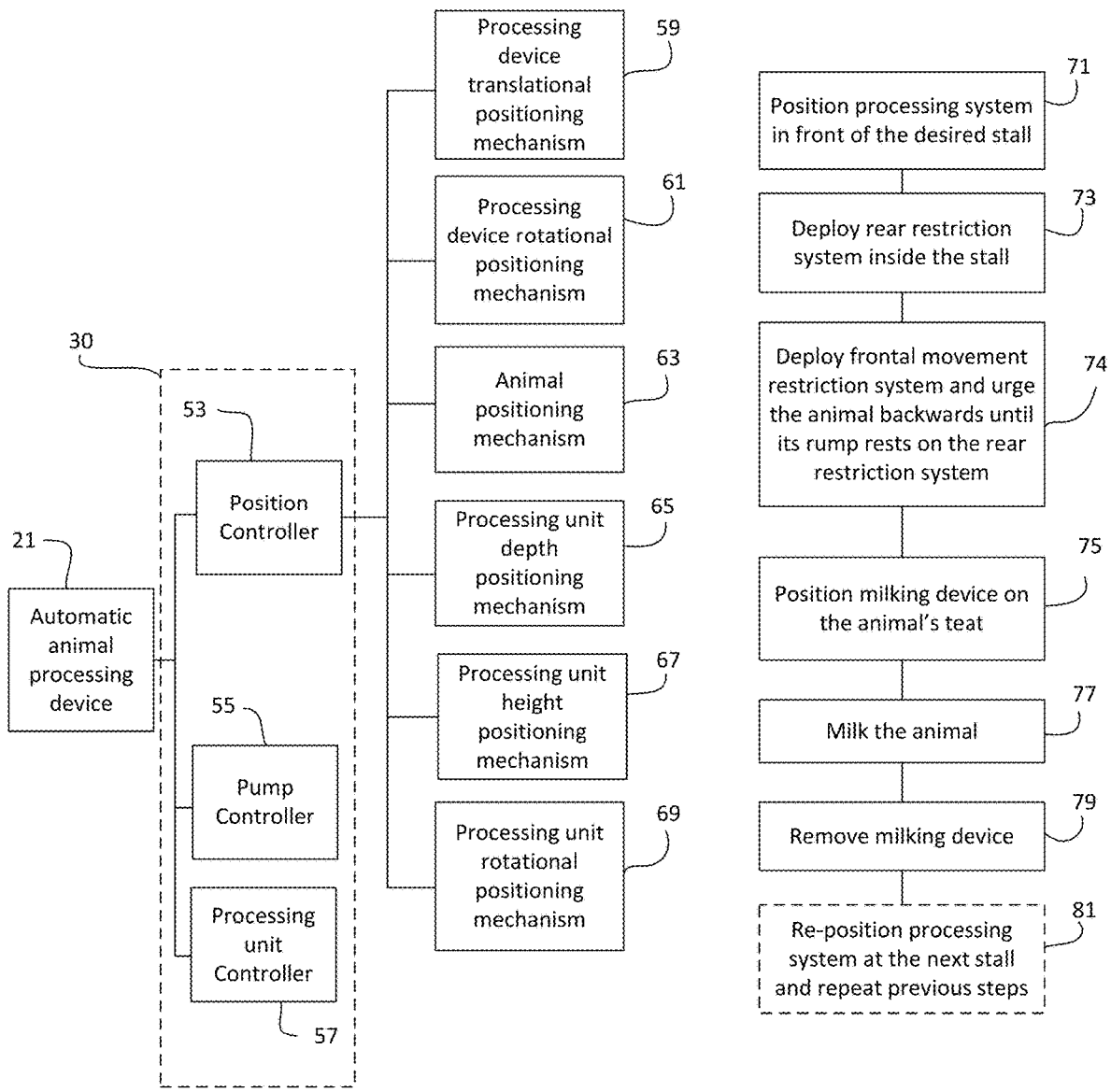
FIG. 7 is a system diagram of an exemplary automatic animal processing device illustrating the main components of the control systems.
FIG. 8 illustrates an exemplary method for milking an animal with an automatic animal processing device.

FIG. 7 illustrates the main components of the control systems of an exemplary automatic animal processing device 21. As disclosed herein, the control terminal 30 may include numerous system components to control the various systems of the processing device. As such, it may include a position controller 53, a pump controller 55 and a processing unit controller 57. The pump controller 55 may be operable to activate and stop the operations of the one or more pumps required to provide processing functionalities. The processing unit controller 57 may control all the operations of the processing unit. For example, if the processing unit is a milking unit, the processing unit controller 57 may control the connection of the teat connector to the animal's teats, either with suction or any other means as is known in the art. As the processing unit may be any processing unit available on the market (i.e. the processing unit may be changed while retaining the functionalities of the remaining parts of the processing device), the processing unit controller 57 may control various sensors, motors, or other components and may be provided by the provider of the processing unit. In such circumstances, the remaining parts of the control terminal 30 may be operable to communicate necessary information to and from the processing unit controller 57.

The position controller 53 may be operable to control the position of both the complete processing device (i.e. its position with regards to the animal's stalls) and of the processing unit (i.e. its position with regards to the animal to be processed). As such, the position controller 53 may have control over numerous positioning mechanism. Each mechanism may consist of any number of sensors and motors/actuators. For example, the sensors may provide a displacement value in one or more axis and allow the position controller 53 to know when to stop. The sensors may include image sensors and the controller may be able to process the image to compute its position (e.g. processing device in front of a stall, processing unit at the correct height with regards to the animal, etc.). The sensors may otherwise include any other sensors such as a coordinate locator (GPS or differential GPS), accelerometers, inertial reference units (e.g. gyroscopes), etc.

The position controller 53 may control the processing device translational positioning mechanism 59 (i.e. the position of the device to move from one stall to the next), the processing device rotational positioning mechanism 61 (i.e. to rotate the device from one side of the aisle to the other), the animal positioning mechanism 63 (i.e. extension and positioning of both the animal's frontal movement restriction system and of the height restriction system).

In some embodiments, the position controller 53 may also control the position of the processing unit, while in other embodiments the position of the processing unit may be provided by the processing unit controller 57. In the embodiment of FIG. 7, the position controller 53 may control the processing unit depth positioning mechanism 65 (i.e. the position of the processing unit inside or out of the stall; translation in the direction of the length of the stall), the processing unit height positioning mechanism 67 (i.e. the height of the processing unit height) and the processing unit rotational positioning mechanism 69 (i.e. to position the unit from the side of the animal to beneath the animal).

A person skilled in the art will appreciate that the control system may be implemented in various ways with different systems and subsystems without departing from the teachings of this disclosure.

While the present disclosure mainly relates to the context of a dairy farm with the processing unit being a milking unit, the structure and systems of the automatic animal processing device may be used for a number of other operations. As a matter of fact, it would be possible to change the processing unit to provide other functionalities (e.g. stall cleaning, etc.) without changing the remaining design of the processing device.

FIG. 8 illustrates an exemplary method for milking an animal with an automatic animal processing device. In this process, the automatic animal processing device is first positioned in front of the stall in which resides an animal to be milked 71. Once positioned, the device may deploy the animal controlling mechanism, such that the animal may be constrained for the remaining steps of milking the animal. The deployment of the animal controlling mechanism may consist of first deploying the rear restriction system inside the stall 73 followed by the step of deploying the frontal movement restriction system to urge the animal backwards until the animal's rumps are against the rear restriction system 74. When both the rear and the frontal restriction systems are deployed, the animal's movement may be restricted such that the animal remains inside its stall for the following steps of processing. The processing unit may then be positioned such that the milking unit connects to the animal's teats 75. Thereafter, the animal may be milked 77 before removing the milking device 79 from the animal's teats. If the device is so equipped, there may be an additional step of cleaning the animal's teats such that it is less prone to diseases and infections. The automatic animal processing device may thereafter be re-positioning in front of the next stall and the steps may be repeated any number of times until all the animals have been processed 81.

What is claimed is:

1. A vehicular animal processing device for automatically milking a domestic animal that is in a stall, said animal processing device comprising:
   a vehicular base automatically displaceable in an aisle of a stall environment to the rear opening of said stall;
   a frontal movement restriction system mounted on a movable top structure comprising a top structure displacement mechanism operable to displace said frontal movement restriction system to a position in front of said animal;
   a rear movement restriction system configured to rest on said animal's rump;
   a deployable support structure mounted to said base and having a horizontal displacement mechanism operable to displace said support structure to extend into said stall and to retract from said stall for movement between stalls; and
   a processing unit rotatably mounted on a mechanical arm, wherein said mechanical arm is mounted to said support structure and movable in a height direction, to automatically position said processing unit at a desired location under said domestic animal,
   wherein, when said deployable support structure is displaced to position said processing unit at a desired location under said domestic animal, passage across said vehicular base is unimpeded by said deployable support structure and said processing unit.

2. The vehicular animal processing device as defined in claim 1, further comprising a trolley mounted on said deployable support structure, wherein said mechanical arm is mounted on said trolley, said trolley being movable over a length of said deployable support structure and said mechanical arm being movable in a height direction.

3. The vehicular animal processing device as defined in claim 1, further comprising at least one ground engaging wheel configured to support said deployable support structure.

4. The vehicular animal processing device as defined in claim 1, further comprising a deployable rear leg positioning system configured to ensure a minimum separation distance between said domestic animal's hind legs.

5. The vehicular animal processing device as defined in claim 1, further comprising a deployable lateral positioning system configured to position an adjacent animal in an adjacent stall on a far side of said adjacent stall.

6. The vehicular animal processing device as defined in claim 1, wherein said deployable support structure is connected to said movable top structure and said displacement mechanism is said top structure displacement mechanism.

7. The vehicular animal processing device as defined in claim 1, wherein said deployable support structure is rotatably mounted to said vehicular base to position said processing unit towards an opposed stall on the opposed side of said aisle.

8. The vehicular animal processing device as defined in claim 1, wherein said processing unit comprises individually controllable teat connectors operable to be automatically positioned at said animal's teats when said processing unit is at said desired location under said domestic animal.

9. The vehicular animal processing device as defined in claim 1, wherein said processing unit further comprises a teat cleaning device.

10. The vehicular animal processing device as defined in claim 1, further comprising a container to store milk processed by said processing unit.

11. The vehicular animal processing device as defined in claim 1, wherein said processing unit is automatically positioned at said desired location under said domestic animal by a laser guidance system.

12. The vehicular animal processing device as defined in claim 1, wherein said processing unit is automatically positioned at said desired location under said domestic animal by a camera guidance system.

\* \* \* \* \*